US009928222B1

(12) United States Patent
Upadhyay et al.

(10) Patent No.: US 9,928,222 B1
(45) Date of Patent: *Mar. 27, 2018

(54) CUSTOMIZING A BROWSING EXPERIENCE ON A MOBILE COMMUNICATIONS DEVICE

(71) Applicant: SPRINT COMMUNICATIONS COMPANY, L.P., Overland Park, KS (US)

(72) Inventors: Piyush Upadhyay, Olathe, KS (US); Badri Prasad Subramanyan, Overland Park, KS (US); Hemanth Balaji Pawar, Brambleton, VA (US); Shilpa Kowdley Srinivas, Brambleton, VA (US); Vivek John Kurisunkal, Kirkland, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 653 days.

This patent is subject to a terminal disclaimer.

(21) Appl. No.: 14/226,146

(22) Filed: Mar. 26, 2014

Related U.S. Application Data

(63) Continuation of application No. 13/356,275, filed on Jan. 23, 2012, now Pat. No. 8,718,028, which is a continuation of application No. 12/239,140, filed on Sep. 26, 2008, now Pat. No. 8,107,452.

(51) Int. Cl.
*H04W 4/00* (2009.01)
*G06F 17/22* (2006.01)

(52) U.S. Cl.
CPC ................. *G06F 17/2247* (2013.01)

(58) Field of Classification Search
CPC ........ H04W 4/001; H04W 4/18; H04W 84/12
See application file for complete search history.

(56) References Cited

U.S. PATENT DOCUMENTS 7,657,907 B2 * 2/2010 Fennan .................. H04H 60/46
725/14
2012/0089845 A1 * 4/2012 Raleigh ................... H04L 12/14
713/176

* cited by examiner

*Primary Examiner* — Kan Yuen (57) ABSTRACT

Embodiments of the present invention relate to systems, methods, and computer storage media for customizing a user agent profile for a mobile communications device. The mobile communications device communicates a request for Hyper Text Transfer Protocol (HTTP) compatible data. The request includes information about capabilities of the mobile communications device. The mobile communications device receives an options page that includes selectable options associated with the capabilities of the mobile communications device. Selectable options of the options page are selected to identify one or more preferences of a user of the mobile communications device. The mobile communications device communicates the selected options to be used for generating the customized user agent profile. The mobile device receives a target HTTP-compatible page that is a variation of the requested HTTP-compatible page, converted based on the customized user agent profile.

16 Claims, 5 Drawing Sheets

CUSTOMIZING A BROWSING EXPERIENCE ON A MOBILE COMMUNICATIONS DEVICE

CROSS-REFERENCE TO RELATED APPLICATIONS

This application is a continuation of U.S. patent application Ser. No. 13/356,275, filed Jan. 23, 2012, entitled "Customizing A Browsing Experience On A Mobile Communications Device," which is a continuation of U.S. patent application Ser. No. 12/239,140, entitled "Customizing A Browsing Experience On A Mobile Communications Device," both of which are herein incorporated by reference.

BACKGROUND

Typically, a mobile communications device has the capability of presenting an Internet page that includes a variety of elements. For example, the Internet page may include textual, graphic, audio, and video elements. Each of the elements that comprise the Internet page can be in a variety of file formats. For example, a graphic element can be in a jpeg or a gif file format, depending on the structure of the Internet page.

Traditionally, before the Internet page is presented on the mobile communications device, the elements of the Internet page are converted into file formats that are compatible with the mobile communications device. The decision as to which elements are converted and what file type is utilized in the conversion are determined based on a service provider or manufacturer supplied specification. The conversion of the Internet page is not based on the preference of the user, but instead on a specification associated with the particular model of the mobile communications device.

SUMMARY

Embodiments of the present invention relate to systems, methods and computer storage media for customizing a user agent profile for a mobile communications device. In a first aspect, a request for a Hyper Text Transfer Protocol compatible ("HTTP-compatible") page is communicated from a mobile communications device, where the request includes information about capabilities of the mobile communications device. The mobile communications device receives an options page that includes selectable options associated with capabilities of the mobile communications device. The mobile device receives a selection as to which of the selectable options are preferred and communicates the selected options to be used for generating the customized user agent profile. The mobile device receives a target HTTP-compatible page that is a variation of the requested HTTP-compatible page, converted based on the customized user agent profile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for customizing a user agent profile for a mobile communications device. The mobile communications device communicates a request to a gateway device. The request is for data compatible with a Hyper Text Transfer Protocol (HTTP). Additionally, the request includes information about the capabilities of the mobile communications device. The gateway device identifies a selection of one or more capabilities of the mobile communications device to customize. An options page is generated that is compatible with HTTP. The options page includes one or more selectable options associated with each of an identified selection of the one or more capabilities. The options page is communicated to the mobile communications device. A user of the mobile communications device makes a selection of the selectable options of the options page to identify one or more preferences of the user or the mobile communications device. A user agent profile is created based, in part, on the selection of the selectable options of the options page. Based on the user agent profile, the requested data compatible with HTTP is converted to correspond with the preferences indicated by the user agent profile.

Accordingly, in one aspect, a method is provided for customizing a user agent profile for a mobile communications device. The method includes communicating, from a mobile communications device, a request for a Hyper Text Transfer Protocol compatible ("HTTP-compatible") page, where the request includes information about capabilities of the mobile communications device. At the mobile communications device, an options page is received that includes one or more selectable options associated with one or more of the capabilities of the mobile communications device. At the mobile communications device, a selection is received as to which of the selectable options are preferred. The selected options to be used for generating the customized user agent profile are communicated from the mobile communications device, and a target HTTP-compatible page is received. The target HTTP-compatible page is a variation of the requested HTTP-compatible page that is converted based on the customized user agent profile.

In another aspect, computer-readable media are provided that embody computer-executable instructions for performing a method for customizing a user agent profile for a mobile communications device. The method includes communicating, from a mobile communications device, a request for a Hyper Text Transfer Protocol compatible ("HTTP-compatible") page, where the request includes information about capabilities of the mobile communications device. At the mobile communications device, an options page is received that includes one or more selectable options associated with one or more of the capabilities of the mobile communications device. At the mobile communications device, a selection is received as to which of the selectable options are preferred. The selected options to be used for generating the customized user agent profile are communicated from the mobile communications device, and a target HTTP-compatible page is received. The target HTTP-compatible page is a variation of the requested HTTP-compatible page that is converted based on the customized user agent profile.

Having briefly described an overview of embodiments of the present invention, an exemplary operating environment suitable for implementing embodiments hereof is described below. Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

Figure 1:
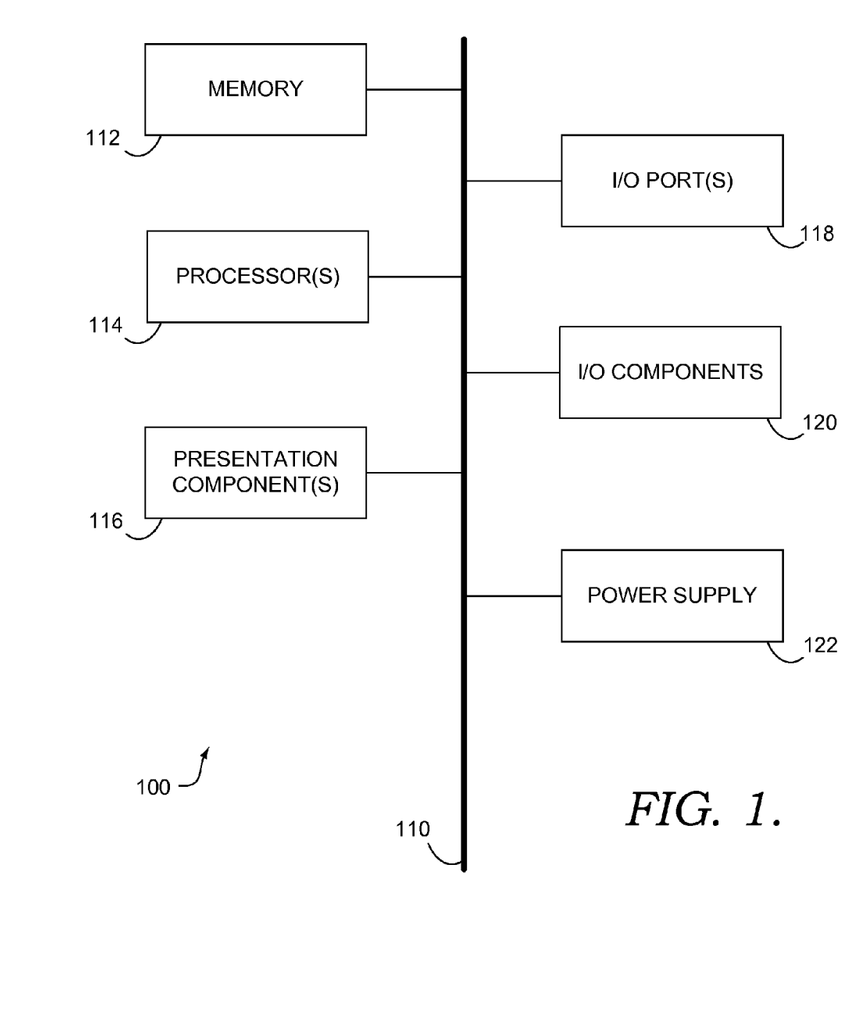
FIG. 1 depicts an exemplary computing device suitable for implementing embodiments of the present invention.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
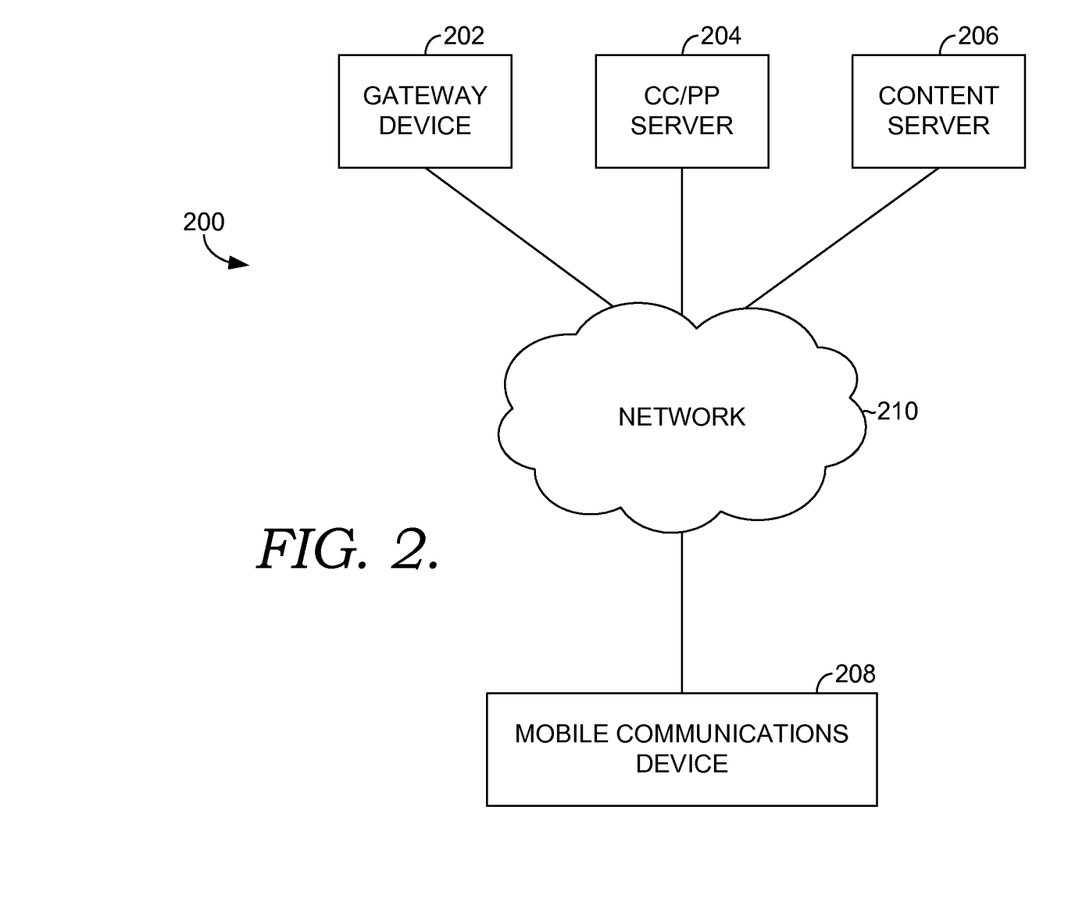
FIG. 2 depicts a block diagram illustrating an exemplary system in which embodiments of the present invention may be employed.

With reference to FIG. 2, a block diagram is provided illustrating an exemplary system 200 in which embodiments of the present invention may be employed. It should be understood that this and other arrangements described herein are set forth only as examples. Other arrangements and elements (e.g., computing devices, networks, servers, devices, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a gateway device 202, a Composite Capabilities/Preference Profiles (CC/PP) server 204, a content server 206, and a mobile communications device 208. Each of the components shown in FIG. 2 may be any type of computing device, such as computing device 100 described with reference to FIG. 1, for example. The components may communicate with each other via a network 210, which may include, without limitation, one or more local-area networks (LANs), wide-area networks (WANs), and/or telecommunication networks. Such networking environments are commonplace in offices, enterprise-wide computer networks, intranets, and the Internet.

The system 200 of FIG. 2 illustrates an architecture in which a user profile for the mobile communications device 208 can be customized in accordance with an embodiment of the invention. Generally, a mobile communications device 208 is a communications device that communicates utilizing technologies compatible with Third Generation Partnership Project (3GPP), the Third Generation Partnership Project 2 (3GPP2), IEEE 802.16 (e.g., WirelessMAN), and IEEE 802.11 (e.g., WiFi). For example, the mobile communications device may be a mobile phone that communicates by way of a wireless network that utilizes a 3GPP compatible protocol. In an additional exemplary embodiment, the mobile communications device 208 is a computing device that communicates by way of a network utilizing a protocol consistent with IEEE 802.16.

Generally, the mobile communications device 208 is capable of receiving HTTP compatible data. For example, Internet documents that are accessible utilizing an Internet Protocol (IP) are but one type of HTTP compatible data. Examples of Internet documents may include news service websites, travel websites, e-commerce websites, blogs, map websites, and email.

Traditionally, HTTP compatible data includes a variety of elements. Examples of the elements include text, images, audio, applications, and video. For example, a news service website may employ textual elements to display a headline along with a photograph, as an image element, to grab attention, while a reporter's account of the news story is provided as an audio element and a video element within the website. Multiple file formats can exist for each element. A device that ultimately presents or displays an element may only have capabilities to present or display a limited number of file formats that are possible. Therefore, elements that are in file formats not compatible with the device that is intended to present or display the elements may not be presented or displayed as a result of the incompatibility of their file format.

Examples of file formats associated with textual elements include css, ecmascript, and plain. Examples of file formats associated with image elements include jpeg, jpg, gif, png, wbmp, and bmp. Examples of file formats associated with audio elements include mp3, mpeg3, mpeg, mpg, mid, midi, x-wav, x-wave, qcelp, amr, aac, m4a, mp4, 3gpp (audio file format), and 3gpp2 (audio file format). Examples of file formats associated with video elements include 3gpp (video file format), 3gpp2 (video file format), and mp4. Examples of application file formats include sdp, Java, x-pmd, and pmd. It is understood by those with ordinary skill in the art that the exemplary file formats listed for each of the elements are merely exemplary and not limiting as to the scope of the present invention. Additionally, it is obvious to those of ordinary skill in the art that the file formats provided as examples are well-known file formats to one of ordinary skill in the art.

As previously discussed, HTTP compatible data may include a variety of elements. The elements may also be in a variety of file formats. Some of the file formats that the HTTP compatible data utilize may not be compatible with a device that is attempting to display or present the HTTP compatible data. For example, the mobile communications device 208 attempts to display a news service website that includes images in a jpg file format, but the mobile communications device cannot display images in the jpg file format, at least in this example. Therefore, the news service website will not display as intended on the mobile communications device 208 because the image elements are not in a file format compatible with the mobile communications device 208.

In some embodiments, the gateway device 202 serves as a proxy server for the mobile communications device 208. For example, the mobile communications device 208 may request HTTP compatible data that includes elements that are of a file format not supported by the mobile communications device 208. As a result, the requested HTTP data is received by the gateway device 202 and the elements of the HTTP data are converted into file formats supported by the mobile communications device 208.

Additional embodiments of the present invention include the gateway device 202 as part of a wireless telecommunications network. In such an embodiment, the gateway device 202 assists a mobile browser of the mobile communications device 208 to receive the requested HTTP compatible data. A wireless telecommunications network includes, but is not limited to, a network that utilizes technology compatible with 3GPP and 3GPP2 protocols.

It should be noted that in some cases, the gateway device 202 receives a request for HTTP compatible data from the mobile communications device 208. The gateway device 202 then sends the request, on behalf of the mobile communications device 208, to the content server 206. The content server 206, in this embodiment is a source of the requested HTTP compatible data. For example, the content server 206 may be a computing device, such as computing device 100 of FIG. 1, that serves content for a news service website. Continuing with the example, when the mobile communications device 208 requests the content of the news service website, the request is communicated from the mobile communications device 208 through network 210 to the gateway device 202. The gateway device 202, in this example, sends the request to the content server 206 utilizing the network 210. As a result, the content server 206 provides the requested HTTP data to the gateway device 202, which may serve as a proxy for the mobile communications device 208.

In further embodiments, the CC/PP server 204 is a computing device that provides specifications that define capabilities and preferences of user agents, such as the mobile communications device 208. CC/PP is a vocabulary extension of the Resource Description Framework (rdf), which is a family of the World Wide Web Consortium (The W3C). Therefore, an rdf specification for a mobile communications device, such as the mobile communications device 208, provides an indication as to the capabilities and resources of the mobile communications device 208. In yet other embodiments, the CC/PP server 204 is capable of providing an indication of the resources and capabilities of a user agent in a format independent of rdf.

An exemplary indication that can be provided by the CC/PP 204 server includes the following list of resources and capabilities associated with a SAMSUNG SPH-A920 mobile communications device.

| HardwarePlatform | |
|---|---|
| Vendor | SAMSUNG |
| Model | SPH-A920 |
| CPU | ARM9 |
| ScreenSize | 176 × 220 |
| ColorCapable | Yes |
| BitsPerPixel | 16 |
| PixelAspectRatio | 1 × 1 |
| ImageCapable | Yes |

|  |  |
|---|---|
| ScreenSizeChar | 16 × 9 |
| StandardFontProportional | Yes |
| OutputCharSet | ISO-8859-1 |
|  | US-ASCII |
|  | UTF-8 |
|  | UTF-16 |
| InputCharSet | ISO-8859-1 |
|  | US-ASCII |
|  | UTF-8 |
| TextInputCapable | Yes |
| Keyboard | PhoneKeypad |
| NumberOfSoftKeys | 2 |
| SoundOutputCapable | Yes |
| VoiceInputCapable | Yes |

| SoftwarePlatform | |
|---|---|
| AcceptDownloadableSoftware | Yes |
| DownloadableSoftwareSupport | application/java-archive |
| SoftwareNumber | ZB07 |
| OSName | Rex |
| OSVendor | QUALCOMM |
| OSVersion | AMSS6500/5380 |
| JavaEnabled | Yes |
| JavaPlatform | MIDP-12 |
|  | SPRINTPCS -12 |
| JVMVersion | SunKVM/1.3 |
| CcppAccept | application/xhtml+xml |
|  | text/vnd.wap.wml |
|  | text/css |
|  | text/ecmascript |
|  | text/vnd.sun.j2me.app-descriptor |
|  | text/x-pcs-gcd |
|  | text/plain |
|  | application/vnd.wap.wmlscriptc |
|  | application/vnd.wap.wmlc |
|  | application/x-pcs-mcd+xml |
|  | application/sdp |
|  | application/java |
|  | application/java-archive |
|  | image/jpeg |
|  | image/jpg |
|  | image/gif |
|  | image/png |
|  | image/vnd.wap.wbmp |
|  | image/wbmp |
|  | image/bmp |
|  | audio/mp3 |
|  | audio/mpeg3 |
|  | audio/mpeg |
|  | audio/mpg |
|  | audio/mid |
|  | audio/midi |
|  | audio/x-wav |
|  | audio/x-wave |
|  | audio/qcelp |
|  | audio/vnd.qcp |
|  | audio/vnd.qcelp |
|  | audio/amr |
|  | application/x-pmd |
|  | application/x-cmx |
|  | application/pmd |
|  | audio/aac |
|  | audio/m4a |
|  | audio/mp4 |
|  | audio/3gpp |
|  | audio/3gpp2 |
|  | audio/mp4a-latm |
|  | video/3gpp |
|  | video/3gpp2 |
|  | video/mp4 |
|  | video/mp4v-es |
| CcppAccept-Charset | ISO-8859-1 |
|  | US-ASCII |
|  | UTF-8 |
|  | UTF-16 |
| CcppAccept-Language | en-us |
| AudioInputEncoder |  |

| NetworkCharacteristics | |
|---|---|
| SecuritySupport | SSL-3.0 |
|  | TLS-1 |
| SupportedBearers | IPv4 |

| BrowserUA | |
|---|---|
| BrowserName | AU System |
| BrowserVersion | AU-MIC/12 MMP/12 |
| FramesCapable | No |
| TablesCapable | Yes |
| PreferenceForFrames | No |
| DownloadableBrowserApps | No |
| JavaAppletEnabled | No |
| JavaScriptEnabled | No |
| XhtmlVersion | XHTML-Basic/1 |
| XhtmlModules |  |

It is understood by those with ordinary skill in the art that the previously discussed SAMSUNG SPH-A920 mobile communications device and the associated listing of capabilities and resources is merely exemplary and is not limiting as to the scope of the present invention. For example, the format of the indication of capabilities and resources that is provided could be expressed as an extensible markup language, comma delimitated, tab delimitated, or other format capable of expressing similar information.

As previously discussed, the content server 206 typically provides content, such as HTTP compatible data, to a requesting entity. For example, the content server 206 may host content that is accessible by way of the Internet. A requesting entity, such as the mobile communications device 208, may request the content of the content server 206. The content of the content server 206 is then communicated to the requesting entity to be presented and/or displayed. The requesting entity in an exemplary embodiment is a plurality of computing devices that are utilized to host and serve content that are accessible to the mobile communications device 208 by way of the network 210.

In an additional exemplary embodiment, the content server 206 provides metadata of the content which it serves. For example, the metadata is data of the content, such as information on the file formats utilized by the various elements that comprise the content served by the content server 206. The metadata is useable to determine which elements of the content are compatible with a requesting entity. Therefore, the content can be converted by a proxy prior to being provided to the requesting entity. The conversion of elements that are either not compatible with or not in the preferred file format of the requesting entity, allows for the presentation of the requested content in a preferred format.

As previously discussed, the network 210 may include LANs, WANs, and telecommunication networks. It is understood by those with ordinary skill in the art that the illustration of network 210, while only visually depicting a single network, in reality may include a plurality of networks. In an exemplary embodiment, the network 210 includes at least one LAN, at least one WAN, and at least one wireless telecommunications network. For example, the mobile communications device 208, in an exemplary embodiment, communicates with the gateway device 202 by way of the network 210, which in this example is a Code Division Multiple Access (CDMA) compatible network. The request received by the gateway device 202 is then communicated to the content server 206 by way of the network 210, but in this portion of the example, the network 210 represents an IP-based network. Therefore, while the network 210 is visually depicted as a single network for discussion purposes, it may actually include multiple and sometimes incompatible networks.

Figure 3:
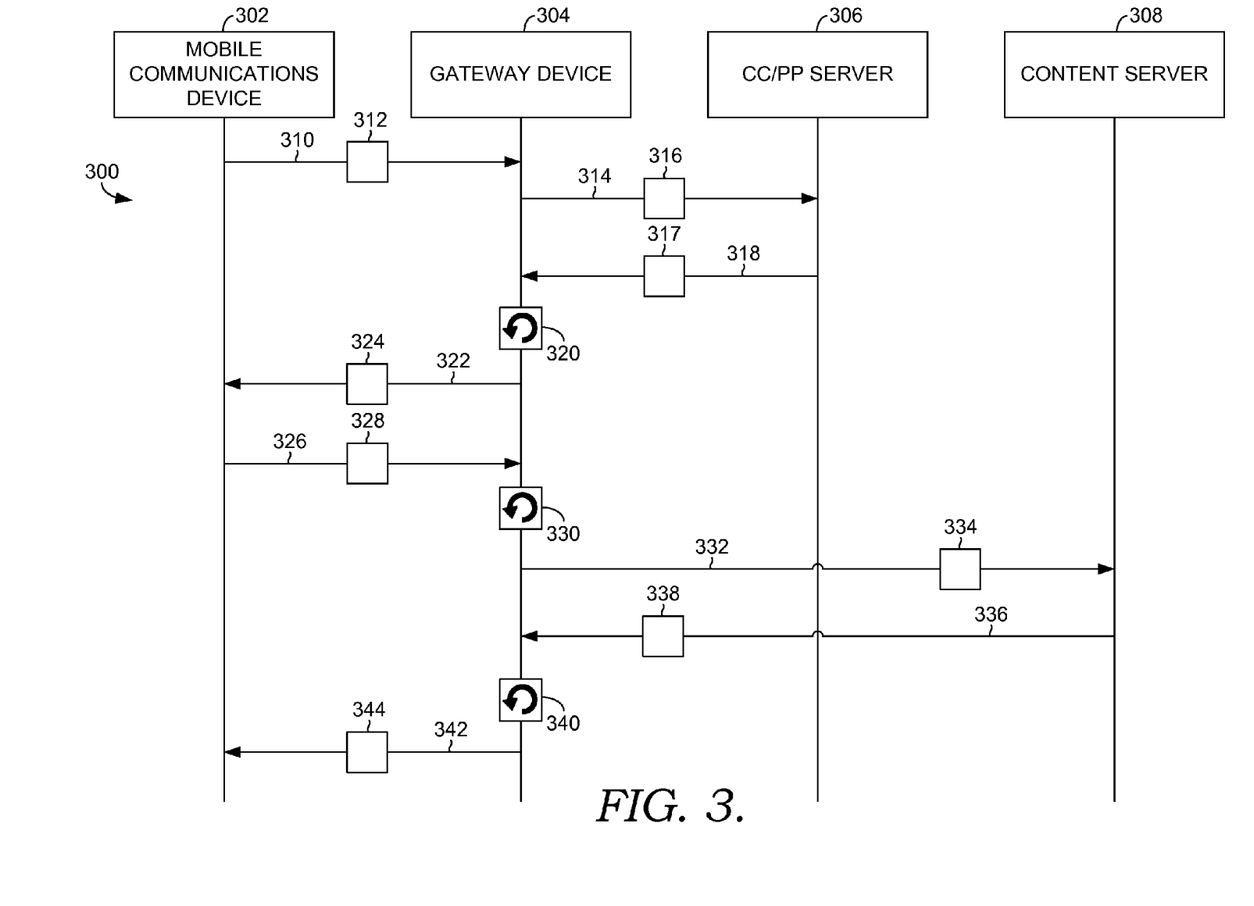
FIG. 3 depicts a flow diagram illustrating a method for customizing a user agent profile for a mobile communications device in accordance with an embodiment of the present invention.

Turning to FIG. 3, a flow diagram is provided illustrating a method 300 for customizing a user agent profile for a mobile communications device in accordance with an embodiment of the present invention. The method 300 includes a mobile communications device 302, a gateway device 304, a CC/PP server 306, and a content server 308. In an embodiment of the present invention, the devices and servers illustrated in conjunction with FIG. 3 are comparable to similarly referenced devices and servers discussed with respect to FIG. 2. For example, the mobile communications device 302 of FIG. 3 is comparable to the mobile communications device 208 of FIG. 2. Additionally, the gateway device 304 is comparable to the gateway device 202 of FIG. 2.

The method 300 includes a step 310 of communicating a request 312 from the mobile communications device 302 to the gateway device 304. In an exemplary embodiment, the step 310 is facilitated, at least in part, over a wireless telecommunications network. For example, the mobile communications device 302 can communicate the request 312 by way of a 3GPP compatible wireless telecommunications network, such as a CDMA network. The request 312 is a request for HTTP compatible data. For example, when a user of the mobile communications device 302 that is utilizing an Internet browser of the mobile communications device 302 to access a website, the request 312 is a request for a particular page of the website.

The gateway device 304 receives the request 312. In an exemplary embodiment, the gateway device 304 identifies the mobile communications device 302 from the request 312. The identification allows the gateway device 304 to determine if a customized user agent profile exists for the mobile communications device 302. For example, when the mobile communications device 302 previously requested HTTP compatible data, the mobile communications device 302 may have established a customized user agent profile that was stored by the gateway 304, the mobile communications device 302, or another computing device (not shown). If a customized user agent profile was previously created, either that profile or a new profile may be utilized by the gateway device 304 when converting the requested data for the mobile communications device 302. For example, the gateway device 304 could automatically utilize a previously created customized user agent profile. In an alternative embodiment, the gateway device 304 will determine if a previously generated user agent profile has expired, such as after a predefined time since creation, if the user agent has not expired, then that user agent profile will be utilized. But, if the user agent profile was determined to have expired, the gateway device 304 will continue with the method 300.

Additionally, in another embodiment, the gateway device 304 will evaluate the request 312 to identify the capabilities and/or resources of the mobile communications device 302. The capabilities and/or resources of the mobile communications device 302 may be included explicitly in the request 312. For example, the request 312 may include characters that are interpretable by the gateway device 304 to identify the preferences associated with the mobile communications device 302. Additionally, the request may include an x-wap-profile reference, which directs the gateway device 304 to a listing of the preferences and/or resources of the mobile communications device 302. For example, the x-wap-profile reference could be an Internet address that references an rdf for the mobile communications device 302. In yet another embodiment, the request may include a reference to a previously created customized user agent profile. Therefore, the gateway 304 is able to utilize the reference to access the previously created customized user profile.

Continuing with the method 300, the gateway device 304, at a step 314 communicates a request 316 to the CC/PP server 306. The request 316 is a request for the capabilities of the mobile communications device 302. The request 316, in an embodiment, is a request for a CC/PP specification of the mobile communications device 302. In another embodiment, the request 316 is a request for an rdf specification of the mobile communications device 302. In yet another embodiment, the request 316 is a request for an indication of the capabilities of the mobile communications device 302, such that the indication is in a format that is able to be interpreted by the gateway device 304. In an exemplary embodiment, the step 314 communicates the request 316 by way of the Internet. In an additional embodiment, the step 314 communicates the request 316 by way of one or more LANs. Yet another embodiment includes the communication of the request 316 by way of a wireless telecommunications network.

The CC/PP server 306 receives the request 316. The request 316 is then analyzed by the CC/PP server 306 to determine the information requested within the request 316. For example, the CC/PP server 306 may include specifications for a variety of different mobile communication devices; therefore, in order to provide the appropriate specification for the mobile communications device 302, the request 316 is analyzed. The CC/PP server 306, at a step 318 communicates an indication 317 to the gateway device 304. In an embodiment, the indication 317 indicates the capabilities of the mobile communications device 302. For example, in an embodiment, the indication 317 is an rdf specification that indicates the file formats for a variety of elements that are supported by the mobile communications device 302. In yet another embodiment, the indication 317 provides an indication as to the resources, capabilities, and preferences generically associated with the mobile communications device 302.

At a step 320, the gateway device 304 generates an options page. The options page includes one or more selectable options that a user of the mobile communications device 302 may choose. For example, the options page may include multiple image file formats from which the user may select, such as a jpeg, a png, and a gif file format. All of which are file formats that the mobile communications device 302 is capable of displaying, as indicated by the indication 317. In an exemplary embodiment, the options page includes samples of each of the presented options. For example, an options page that includes a gif file format option, a png file format option, and a gif file format option would include a sample image presented in each of the file formats to allow the user of the mobile communications device to select an option based on the samples of the options. In an additional embodiment, the options page includes a classification system that rates the various options. For example, the quality of each compatible file format may be ranked relative to one another. Additionally, the loading speed of each of the compatible file formats may be ranked relative to one another. In yet another embodiment, the combination of quality and load speed are used as metrics to compare options of the options page. It is within the scope of the present invention that the techniques discussed with respect to image elements equally apply to other elements, such as textual, audio, application, and video elements. Additionally, the options page, in an embodiment, provides options for any capability or resource that is identified in the indication 317, for example, a language preference that will be utilized when converting the requested HTTP compatible data.

The gateway device 304 communicates an options page 324 to the mobile communications device 302 at a step 322. The options page 324 is the options page generated at the step 320. In an embodiment of the present invention, the communication of the options page 324 is facilitated by a wireless telecommunications network. In an additional embodiment, the communication of the options page 324 is facilitated by an IP-based network, such as a LAN or WAN.

As previously discussed, in an embodiment, the options page 324 is an HTTP compatible page. Therefore, the browser of the mobile communications device 302 utilized to request HTTP compatible data is capable of presenting and/or displaying the options page 324. For example, the options page 324 is created as an HTTP compatible page that is displayable on an Internet browser of the mobile communications device 302.

The mobile communication device 302 receives the options page 324. The mobile communications device 302 reads and displays the options page so that a user can select one or more of the options included with the options page. In an embodiment, a user of the mobile communications device 302 views the options page 324 and interacts with the mobile communications device 302 to make a selection of one or more options of the options page. For example, the user may select a preferred option for image elements to be in a jpeg file format based on the perceived quality and load speed associated with the jpeg file format. Therefore, a user agent profile will be customized to indicate that image elements should be converted, such as by transformation, to jpeg file formats if the content server 308 does not typically provide the image elements in the jpeg file format.

User interactions with the mobile communications device 302 to select the desired options include the use of a keypad associated with the mobile communications device 302. User interaction may also include a user input to a track ball or other input device that allows a user to select an option from an HTTP compatible options page. Additionally, the user interaction includes voice commands allowing the user to select an option through audible selection. Further, it is within the scope of the present invention for a user to utilize a touch screen of the mobile communications device 302 to interact with the options page that is displayed.

At a step 326, a selection 328 of the one or more options is communicated from the mobile communications device 302 to the gateway device 304. In an embodiment, the communication of the selection 328 is by way of a wireless telecommunications network. In an additional embodiment, the communication of the selection 328 is by way of an IP-based network, such as a LAN or a WAN. The selection 328 is a selection of the preferred options presented by the options page 324. For example, if a user of the mobile communications device 302 selects an option for image elements to be in a jpeg file format, the selection 328 would include that selection.

The gateway device 304 receives the selection 328. At a step 330 the gateway device 304 creates a user agent profile. The user agent profile is a profile customized for the mobile communications device 302 based on the selection 328. For example, the customized user agent profile includes the preferences of the user of the mobile communications device 302 as to the capabilities and resources that are compatible with the mobile communications device. Therefore, the user agent profile provides a guide for a proxy to convert elements of requested content into formats, styles, or options selected based on the selection 328.

In an embodiment, the customized user agent profile is stored at the gateway device 304 for subsequent requests by the mobile communications device 302. In an additional embodiment, the customized user agent profile is communicated to a computing device and/or the mobile communications device (not shown) to be stored for later requests by the mobile communications device 302.

At a step 332, the gateway device 304 communicates a request 334 to the content server 308. The request 334 is a request for HTTP compatible data that was requested by the mobile communications device 302 in the request 312. In an embodiment, the request 312 is communicated once a customized user agent profile exists for the mobile communications device 302. In an additional embodiment, the gateway device 304 serves as a proxy for the mobile communications device 302; therefore, the gateway device 304 receives the request 312 from the mobile communications device 302 and creates the request 334 as a proxy request for the HTTP compatible data indicated by the request 312.

At a step 338, the content server 308 that serves the requested HTTP compatible data communicates the requested HTTP compatible data 338 to the gateway device 304. In an embodiment, the data 338 includes elements, such as textual, image, audio, and video elements of a variety of file formats. At a step 336, the gateway device 304 receives the data 338 and converts the data 338 to conform to the customized user agent profile of step 330. For example, if the customized user agent profile includes a preferred option for image elements to be in the jpeg file format, but the image elements of the data 338 are provided in a png file format, the gateway device 304 will convert the image elements to a jpeg file format from the png file format.

At a step 342, the gateway device 304 communicates a target page 344 to the mobile communications device 302. The target page 344 is a converted version of the HTTP compatible data originally requested at the step 310. For example, elements of the requested HTTP compatible data that do not conform to the customized user agent profile are converted to conform. As a result, the converted elements and the conforming, but nonconverted elements, result in a target page, such as the target page 344. The target page can therefore be presented on the mobile communications device 302 in a format that conforms to the customized user agent profile.

Figure 4:
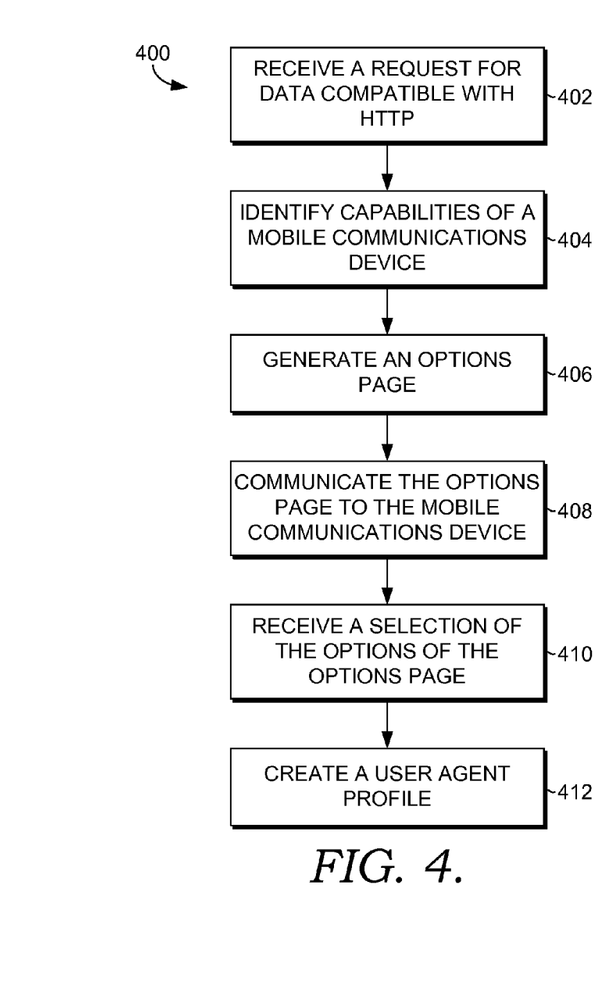
FIG. 4 depicts another flow diagram illustrating a method for customizing a user agent profile for a mobile communications device in accordance with an embodiment of the present invention.

Turning to FIG. 4, a flow diagram is provided illustrating a method 400 for customizing a user agent profile for a mobile communications device in accordance with an embodiment of the present invention. As shown at a block 402, a request for data compatible with HTTP is received. For instance, the request may originate from a mobile communications device to a gateway device. The HTTP compatible data may include an Internet accessible page that is compatible with HTTP.

As shown at a block 404, the capabilities of a mobile communications device are identified. As previously discussed, the capabilities may be identified explicitly from the received request or from a resource identifier associated with the request. For example the capabilities may be identified from an rdf specification that is accessed by a gateway device utilizing a resource identifier included with the request received at the block 402.

After identifying the capabilities of the mobile communications device, an options page is generated, as shown at a block 406. As previously discussed, the options page includes one or more options that the mobile communications device is capable of presenting and/or displaying. For example, an option that a user of the mobile communications device may select from is the language in which the textual elements are displayed. A user may select English as a preferred language that could then be utilized to translate data that includes textual elements that are not provided in English, into the English language.

As shown at a block 408, the options page is communicated to the mobile communications device. In an exemplary embodiment, the options page is a page that allows a user of the mobile communications device to select from a plurality of options to identify those options that the user prefers or desires for the mobile communications device. Once a selection of the options has been made by the user, the gateway receives the selection of the options of the options page, as shown at a block 410. In an embodiment, the selection of the options is in a format compatible with HTTP. In an additional embodiment, the selection of the options is in a format compatible with Short Message System (SMS) protocol.

At a block 412, a user agent profile is created. The user agent profile, in an embodiment, is a profile that identifies the options selected from the options page so that content can be converted to conform with the user agent profile. In an embodiment, the user agent profile is specific to a particular user and therefore varies from a standard specification associated with a particular model of mobile communications device. Additionally, the user agent profile allows a user to select options that while compatible with the mobile communications device, the options may not be the preference of the mobile communications device as identified by a service provider or manufacturer of the mobile communications device. For example, an rdf for a mobile communications device may indicate some or all compatible options for the mobile communications device, but the service provider or manufacturer has included a preference as to which of the options should be utilized based on resources or other criteria utilized by the service provider or manufacturer. Therefore, in an embodiment, the user agent profile generated based on user selected options allows the options preferred by the user, not the service provider or the manufacturer, to be respected when manipulating data.

Figure 5:
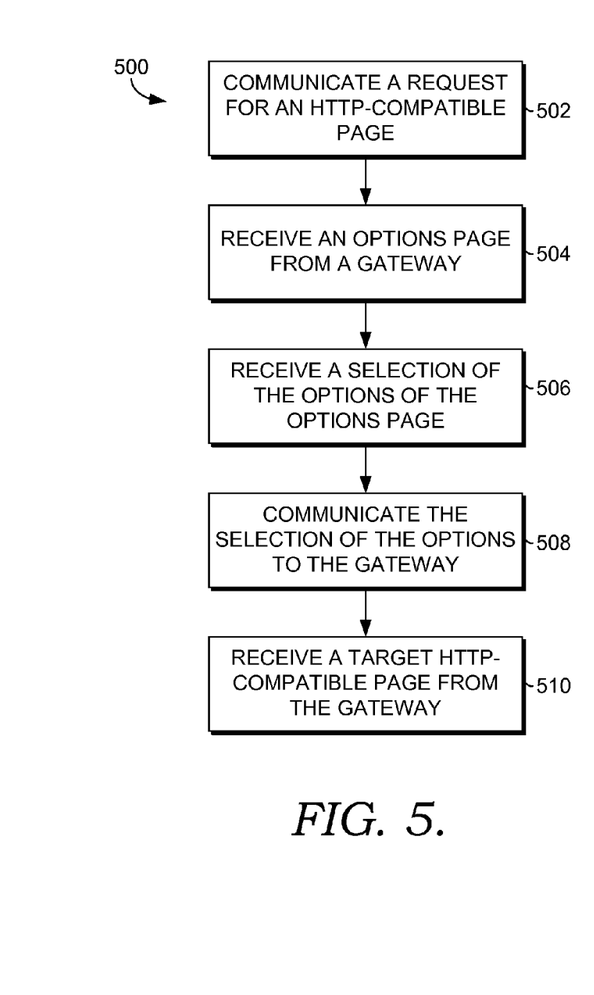
FIG. 5 depicts yet another flow diagram illustrating a method for customizing a user agent profile for a mobile communications device in accordance with an embodiment of the present invention.

Turning to FIG. 5, a flow diagram is provided illustrating a method 500 for customizing a user agent profile for a mobile communications device in accordance with an embodiment of the present invention. As shown at a block 502, a request is communicated for an HTTP-compatible page. In an embodiment, a user of a mobile communications device requests the a webpage utilizing an Internet browser of the mobile communications device. In an embodiment, the request is communicated to a content server that serves the requested content, but a gateway device associated with a network on which the mobile communications device is communicating intercepts the request to serve as a proxy. In an alternative embodiment, the request is communicated to the gateway device with the intention that the gateway device will serve as a proxy for the mobile communications device.

The gateway device that eventually receives the request from the mobile communications device, in an embodiment, will identify if a user agent profile exists for the mobile communications device. When it is determined that a user agent profile is not current for the mobile communications device, the gateway device creates an options page that includes one or more selectable options based on the capabilities of the mobile communications device. The options page is received by the mobile communications device from the gateway, as shown at a block 504.

A user of the mobile communications device selects one or more options from the options page. The selection of the one or more options from the options page is received by the mobile communications device, as shown at a block 506. The selection, in an embodiment is received by way of a touch screen or keypad of the mobile communications device. The selection of options provides an indication of the user's preferences with respect to the selected options. The selection of the one or more options is communicated to the gateway device, as shown at a block 508. The communications of the selections, in an embodiment, is done automatically by the mobile communications device. In an additional embodiment, the communications of the selections are initiated by the user of the mobile communications device once the user has determined that the selections are complete.

At a step 510, the mobile communications device receives a target HTTP-compatible page from the gateway device. The target HTTP-compatible page is a converted version of the HTTP-compatible page requested at the block 502. As previously described, the gateway device, in an embodiment, serves as a proxy for the mobile communications device to convert requested pages that are in formats incompatible with the mobile communication device, to pages that are compatible with the mobile communications device. The converted page is the target HTTP-compatible page received at the block 510.

Figure 6:
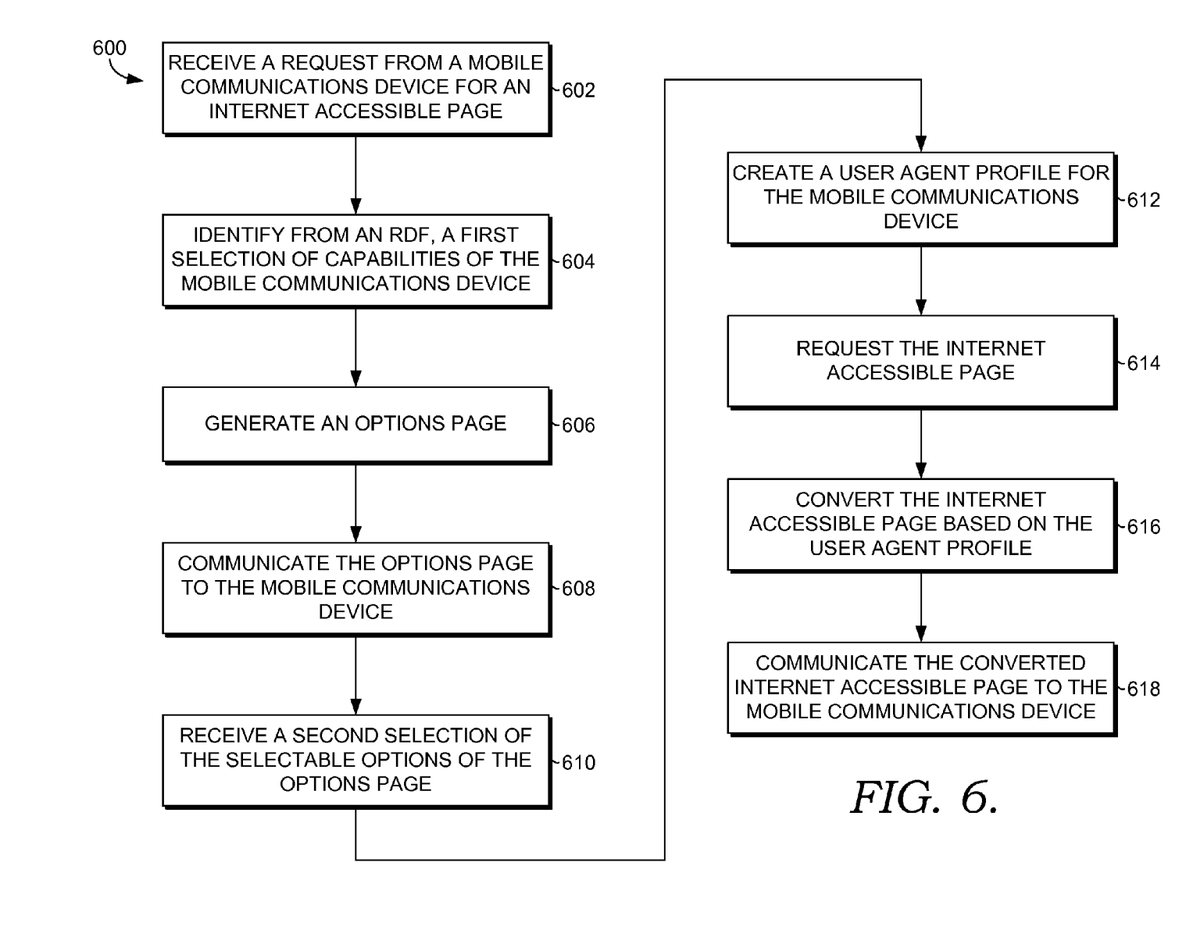
FIG. 6 depicts an additional flow diagram illustrating a method for customizing a user agent profile for a mobile communications device in accordance with an embodiment of the present invention.

Turning to FIG. 6, a flow diagram is provided illustrating a method 600 for customizing a user agent profile for a mobile communications device in accordance with an embodiment of the present invention. As shown at a block 602, a gateway device receives a request from a mobile communications device for an Internet accessible page. The request, in an embodiment, is initiated at the mobile communications device by a user of the mobile communications device. The user, in the embodiment, is accessing the Internet accessible page utilizing an Internet browser associated with the mobile communications device.

As shown at a block 604, the gateway device identifies a first selection of capabilities of the mobile communications device. In an exemplary embodiment, the capabilities are identified from an rdf specification that is accessible from a CC/PP server. An options page is generated based on the first selection of capabilities of the mobile communications device, as shown at a block 606. The options page may be generated by the gateway device or a computing device utilized to generate options pages for one or more mobile communications devices. The options page is communicated to the mobile communications device from the entity that generated the options page, as shown at a block 608.

A selection from the options page, referred to as a second selection of selectable options of the options page, is received from the mobile communications device, as shown at a block 610. In an embodiment, the selection from the options page is received by the gateway device, but in an additional embodiment, the selection from the options page is received by a computing device that will create a user agent profile for the mobile communications device. As shown at a block 612, a user agent profile is created utilizing the received selection from the options page.

As shown at a block 614, the Internet accessible page is requested. For example, the Internet accessible page requested at the block 602 is requested from the content server that is identified as serving the Internet accessible page. The Internet accessible page is received and converted based on the user agent profile, as shown at a block 616. As previously discussed, the conversion of the Internet accessible page includes converting and transforming those elements and characteristics of the Internet accessible page that do not conform to the user agent profile. In an embodiment, the conversion is performed by the gateway device, but in an additional embodiment, the conversion is performed by a computing device whose function is to perform the conversions based on user agent profiles. As shown at a block 618, the converted Internet accessible page, as referred to as a target HTTP-compatible page, is communicated to the mobile communications device. In an embodiment, the converted Internet accessible page is communicated from the gateway device, but in an additional embodiment, the converted Internet accessible page is communicated from a computing device whose function is to perform the conversion.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon that, when executed, perform a method for customizing a user agent profile for a mobile communications device, the method comprising:
communicating, from a mobile communications device, a request for a Hyper Text Transfer Protocol compatible ("HTTP-compatible") page, wherein the request includes information about capabilities of the mobile communications device;
at the mobile communications device, receiving an options page that includes one or more selectable options associated with one or more of the capabilities of the mobile communications device;
at the mobile communications device, receiving a selection as to which of the selectable options are preferred;
communicating, from the mobile communications device, the selected options to be used for generating the customized user agent profile; and
receiving a target HTTP-compatible page, wherein the target HTTP-compatible page is a variation of the requested HTTP-compatible page that is converted based on the customized user agent profile.

2. The media of claim 1, wherein the mobile communications device is compatible with a wireless technology wherein the wireless technology is selected from a group including wireless technologies in the Third Generation Partnership Project (3GPP), Third Generation Partnership Project 2 (3GPP2), IEEE 802.16, and IEEE 802.11.

3. The media of claim 1, wherein the information about the capabilities of the mobile communications device references a Resource Description Framework (RDF) specification from a Composite Capabilities/Preference Profiles (CC/PP) server.

4. The media of claim 1, wherein the information about the capabilities of the mobile communications device is an X-Wap-Profile header.

5. The media of claim 1 further comprising displaying the options page on a display of the mobile communications device, such that the user is able to view the selectable options.

6. The media of claim 1 further comprising receiving an HTTP-compatible confirmation page at the mobile communications device, wherein the confirmation page includes the selected options.

7. The media of claim 1 further comprising:
communicating, from the mobile communications device, a second request for a second HTTP-compatible page;
receiving a second target HTTP-compatible page from the gateway, wherein the second target HTTP-compatible page is a variation of the requested second HTTP-compatible page that is converted based on the user agent profile.

8. The media of claim 1, wherein the conversion of the requested second HTTP-compatible page to the second target HTTP-compatible page includes an image translation of images of the requested second HTTP-compatible page.

9. A method for customizing a user agent profile for a mobile communications device, comprising:
communicating, from a mobile communications device, a request for a Hyper Text Transfer Protocol compatible ("HTTP-compatible") page, wherein the request includes information about capabilities of the mobile communications device;
at the mobile communications device, receiving an options page that includes one or more selectable options associated with one or more of the capabilities of the mobile communications device;
at the mobile communications device, receiving a selection as to which of the selectable options are preferred;
communicating, from the mobile communications device, the selected options to be used for generating the customized user agent profile; and
receiving a target HTTP-compatible page, wherein the target HTTP-compatible page is a variation of the requested HTTP-compatible page that is converted based on the customized user agent profile.

10. The method of claim 9, wherein the mobile communications device is compatible with a wireless technology wherein the wireless technology is selected from a group including wireless technologies in the Third Generation Partnership Project (3GPP), Third Generation Partnership Project 2 (3GPP2), IEEE 802.16, and IEEE 802.11.

11. The method of claim 9, wherein the information about the capabilities of the mobile communications device references a Resource Description Framework (RDF) specification from a Composite Capabilities/Preference Profiles (CC/PP) server.

12. The method of claim 9, wherein the information about the capabilities of the mobile communications device is an X-Wap-Profile header.

13. The method of claim 9 further comprising displaying the options page on a display of the mobile communications device, such that the user is able to view the selectable options.

14. The method of claim 9 further comprising receiving an HTTP-compatible confirmation page at the mobile communications device, wherein the confirmation page includes the selected options.

15. The method of claim 9 further comprising:
communicating, from the mobile communications device, a second request for a second HTTP-compatible page;
receiving a second target HTTP-compatible page from the gateway, wherein the second target HTTP-compatible page is a variation of the requested second HTTP-compatible page that is converted based on the user agent profile.

16. The method of claim 9, wherein the conversion of the requested second HTTP-compatible page to the second target HTTP-compatible page includes an image translation of images of the requested second HTTP-compatible page.

\* \* \* \* \*